United States Patent
Homma et al.

(10) Patent No.: US 12,130,547 B2
(45) Date of Patent: *Oct. 29, 2024

(54) IMAGE DISPLAY APPARATUS

(71) Applicant: SONY GROUP CORPORATION, Tokyo (JP)

(72) Inventors: Keisuke Homma, Kanagawa (JP); Kazuya Matsumoto, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,881

(22) Filed: May 30, 2023

(65) Prior Publication Data

US 2023/0296977 A1 Sep. 21, 2023

Related U.S. Application Data

(63) Continuation of application No. 17/535,888, filed on Nov. 26, 2021, now Pat. No. 11,693,305, which is a
(Continued)

(30) Foreign Application Priority Data

Jul. 12, 2017 (JP) .................. 2017-136618

(51) Int. Cl.
*G03B 33/12* (2006.01)
*G03B 21/00* (2006.01)
(Continued)

(52) U.S. Cl.
CPC ........... *G03B 33/12* (2013.01); *G03B 21/006* (2013.01); *G03B 21/008* (2013.01); *G03B 21/2053* (2013.01); *G03B 21/28* (2013.01)

(58) Field of Classification Search
CPC .... G03B 21/006; G03B 21/008; G03B 21/28; G03B 21/2013; G03B 21/2033;
(Continued)

(56) References Cited

U.S. PATENT DOCUMENTS 11,119,394 B2 *  9/2021 Akiyama ........... G03B 21/2073
2007/0273796 A1 * 11/2007 Silverstein ........... G02B 27/145
348/752
(Continued)

FOREIGN PATENT DOCUMENTS

JP      2004226631 A      8/2004
JP      2006-267868 A     10/2006
(Continued)

OTHER PUBLICATIONS

International Search Report issued Aug. 14, 2018 in PCT/JP2018/019073 filed May 17, 2018, 2 pages.

*Primary Examiner* — Sultan Chowdhury
(74) *Attorney, Agent, or Firm* — Oblon, McClelland, Maier & Neustadt, L.L.P.

(57) ABSTRACT

An image display apparatus according to an embodiment of the present technology includes an optical modulator, an optical device, and a sensor unit. The optical device splits a modulated light beam modulated by the optical modulator into a first split light beam and a second split light beam, the first split light beam and the second split light beam each travelling in a different direction, and prevents a light beam, which backwardly travels on an optical path of the first split light beam and enters the optical device, from travelling along an optical path of the second split light beam. The sensor unit is disposed on the optical path of the second split light beam and detects a state of the second split light beam.

20 Claims, 10 Drawing Sheets

Related U.S. Application Data continuation of application No. 16/628,227, filed as application No. PCT/JP2018/019073 on May 17, 2018, now Pat. No. 11,209,725.

(51) Int. Cl.
  G03B 21/20 (2006.01)
  G03B 21/28 (2006.01)

(58) Field of Classification Search
  CPC ............ G03B 21/2053; H04N 13/324; H04N 13/337; H04N 13/346; H04N 13/363; G02B 27/141; G02B 27/145; G02B 27/285; G02B 27/286
  See application file for complete search history.

(56) References Cited

U.S. PATENT DOCUMENTS

| | | |
|---|---|---|
| 2008/0180640 A1 | 7/2008 | Ito |
| 2012/0105809 A1 | 5/2012 | Yu |
| 2013/0070208 A1 | 3/2013 | Nakanishi |
| 2015/0172591 A1 | 6/2015 | Nobori |
| 2015/0234197 A1 | 8/2015 | Ushigome |
| 2016/0360953 A1* | 12/2016 | Mitchell ............ A61B 5/14552 |
| 2017/0089758 A1 | 3/2017 | Okamoto |
| 2017/0208308 A1* | 7/2017 | Iguchi ................ G03B 21/204 |
| 2018/0017856 A1 | 1/2018 | Tanaka |

FOREIGN PATENT DOCUMENTS

| | | |
|---|---|---|
| JP | 2006330177 A | 12/2006 |
| JP | 2007-065012 A | 3/2007 |
| JP | 2008-129261 A | 6/2008 |
| JP | 2009-042342 A | 2/2009 |
| JP | 2011043596 A | 3/2011 |
| JP | 2012048832 A | 3/2012 |
| JP | 2012215755 A | 11/2012 |
| JP | 2012234161 A | 11/2012 |
| JP | 2014219681 A | 11/2014 |
| JP | 2015-004734 A | 1/2015 |
| JP | 2015-079208 A | 4/2015 |
| JP | 2015090406 A | 5/2015 |
| JP | 2017-111223 A | 6/2017 |
| JP | 2017-111303 A | 6/2017 |
| WO | WO-2009050876 A1 | 4/2009 |
| WO | WO 2009/093439 A1 | 7/2009 |
| WO | WO 2014/132675 A1 | 9/2014 |

* cited by examiner

IMAGE DISPLAY APPARATUS

CROSS-REFERENCE TO RELATED APPLICATIONS

This is a continuation application of U.S. application Ser. No. 17/535,888, filed Nov. 26, 2021, which is a continuation application of U.S. application Ser. No. 16/628,227, filed Jan. 2, 2020, (now U.S. Pat. No. 11,209,725, issued Dec. 28, 2021), which is a National Stage of International Application No. PCT/JP2018/019073, filed May 17, 2018, which claims the benefit Japanese Application No. 2017-136618 filed Jul. 12, 2017, the entire contents of each of which are hereby incorporated by reference herein in their entirety.

TECHNICAL FIELD

The present technology relates to an image display apparatus such as a projector.

BACKGROUND ART

Conventionally, image display apparatuses such as a projector have been widely used. For example, an optical modulator such as a liquid-crystal device modulates a light beam from a light source and the modulated light beam is projected to a screen or the like for displaying an image. A mercury lamp, a xenon lamp, a light emitting diode (LED), a laser diode (LD), or the like is used as the light source. A solid-state light source which is the LED, the LD, or the like among them has long lifetime, and lamp replacement is not required unlike the conventional one. Moreover, such a solid-state light source has an advantage that the light is turned on immediately after it is powered on.

Patent Literature 1 has described an image projection apparatus that displays a 3D (stereoscopic) picture by making use of a difference in polarized light characteristics. In this image projection apparatus, a right-eye picture is made incident upon a prism-type beam splitter to become a P-polarized light beam and a left-eye picture is made incident upon the prism-type beam splitter to become an S-polarized light beam. The prism-type beam splitter combines the right-eye picture with the left-eye picture. The combined picture is projected to a screen via a projection lens (Paragraphs [0040], [0049], and [0051] of specification, FIG. 3, and the like of Patent Literature 1).

Patent Literature 2 has described a projection-type display apparatus including a polarization beam splitter that reflects respective RGB light beams to a reflective type light bulb and transmits the light beams modulated by the reflective type light bulb toward the projection lens. In this projection-type display apparatus, an area sensor is disposed on a surface of the surfaces of the polarization beam splitter, on an opposite side of a surface that the respective RGB light beams enter. The area sensor detects a state of leaking light that has not been reflected by the polarization beam splitter and has passed through the polarization beam splitter as it is. The respective components can be easily aligned on the basis of a detection result of the area sensor. Moreover, a degradation state of each component can be grasped (Paragraphs [0044] to [0058] and [0083] of specification, FIG. 3, and the like of Patent Literature 2).

CITATION LIST

Patent Literature

Patent Literature 1: WO 2014/132675
Patent Literature 2: Japanese Patent Application Laid-open No. 2008-129261

DISCLOSURE OF INVENTION

Technical Problem

It can be considered that various projectors such as a large projector for digital cinema using a laser light source and a projector configured for 3D pictures will be propagated in the future. In such an image display apparatus such a projector, it is desirable to provide a technology that enables a state of a light beam to be detected with high accuracy.

In view of the above-mentioned circumstances, it is an object of the present technology to provide an image display apparatus capable of detecting a state of a light beam with high accuracy.

Solution to Problem

In order to accomplish the above-mentioned object, an image display apparatus according to an embodiment of the present technology includes an optical modulator, an optical device, and a sensor unit.

The optical device splits a modulated light beam modulated by the optical modulator into a first split light beam and a second split light beam, the first split light beam and the second split light beam each travelling in a different direction, and prevents a light beam, which backwardly travels on an optical path of the first split light beam and enters the optical device, from travelling along an optical path of the second split light beam.

The sensor unit is disposed on the optical path of the second split light beam and detects a state of the second split light beam.

In this image display apparatus, the optical device splits the modulated light beam into the first and second split light beams. Further, the optical device prevents the light beam, which backwardly travels on the optical path of the first split light beam and enters the optical device, from travelling along the optical path of the second split light beam. Therefore, a state of the modulated light beam can be detected with high accuracy by arranging the sensor unit on the optical path of the second split light beam.

The optical device may be disposed on a main optical path of the modulated light beam, emit the first split light beam along the main optical path, and emit the second split light beam along another optical path.

The optical device may include a first emitting surface that emits the first split light beam, and a second emitting surface that emits a second split light beam, the second emitting surface being different from the first emitting surface. In this case, the sensor unit may be disposed on a side of the second emitting surface.

The optical device may include a light-splitting surface that is disposed obliquely to a direction of incidence of the modulated light beam that enters the optical device.

The light-splitting surface may transmit a part of the modulated light beam that enters the light-splitting surface as the first split light beam, and reflect another part of the modulated light beam as the second split light beam. In this case, the sensor unit may be disposed on a side of the light-splitting surface that reflects the second split light beam.

The light-splitting surface may reflect a part of the modulated light beam that enters the light-splitting surface as the first split light beam, and transmit another part of the modulated light beam as the second split light beam. In this case, the sensor unit may be disposed on a side of a surface on an opposite side of the light-splitting surface.

The optical device may split the modulated light beam such that an amount of light of the first split light beam is larger than an amount of light of the second split light beam.

The image display apparatus may further include: a combining unit that combines a plurality of modulated light beams to generate a combined modulated light beam; and a projecting unit that projects the combined modulated light beam generated by the combining unit. In this case, the optical device may be disposed between the combining unit and the projecting unit, and split the combined modulated light beam into the first split light beam and the second split light beam.

The optical device may include a light-splitting prism including a first surface that the modulated light beam enters, a light-splitting surface that splits the modulated light beam that enters the first surface, and a second surface from which the second split light beam split by the light-splitting surface is emitted. In this case, the sensor unit may be disposed in proximity to the second surface of the light-splitting prism.

The optical device may include a polarization beam splitter, a half mirror, or a glass plate.

The image display apparatus may further include a first emitter that emits a first image light beam in a first polarization state in a first direction. In this case, the optical device may include a light-splitting surface that is disposed obliquely to the first direction. Further, the light-splitting surface may transmit a part of the first image light beam to travel on a first optical path extending in the first direction, and reflect another part of the first image light beam to travel on a second optical path extending in a second direction substantially orthogonal to the first direction. Further, the sensor unit may be disposed on the second optical path.

The image display apparatus may further include a second emitter that emits a second image light beam in a second polarization state in the second direction. In this case, the light-splitting surface may be disposed obliquely to the second direction, reflect a part of the second image light beam to travel on the first optical path, and transmit another part of the second image light beam to travel on the second optical path.

The sensor unit may include a first filter that extracts a light beam in the first polarization state, a first sensor that detects a state of the light beam extracted by the first filter, a second filter that extracts a light beam in the second polarization state, and a second sensor that detects a state of the light beam extracted by the second filter.

The sensor unit may detect at least one of intensity, chromaticity, or a luminous flux shape of the second split light beam.

The optical device may be configured for applying a predetermined action to an incident light beam, and split the modulated light beam that enters the optical device into the first split light beam to which the predetermined action is applied and the second split light beam to which the predetermined action is not applied.

Advantageous Effects of Invention

As described above, in accordance with the present technology, the state of the light beam can be detected with high accuracy. It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.
[Image Display Apparatus]

Figure 1:
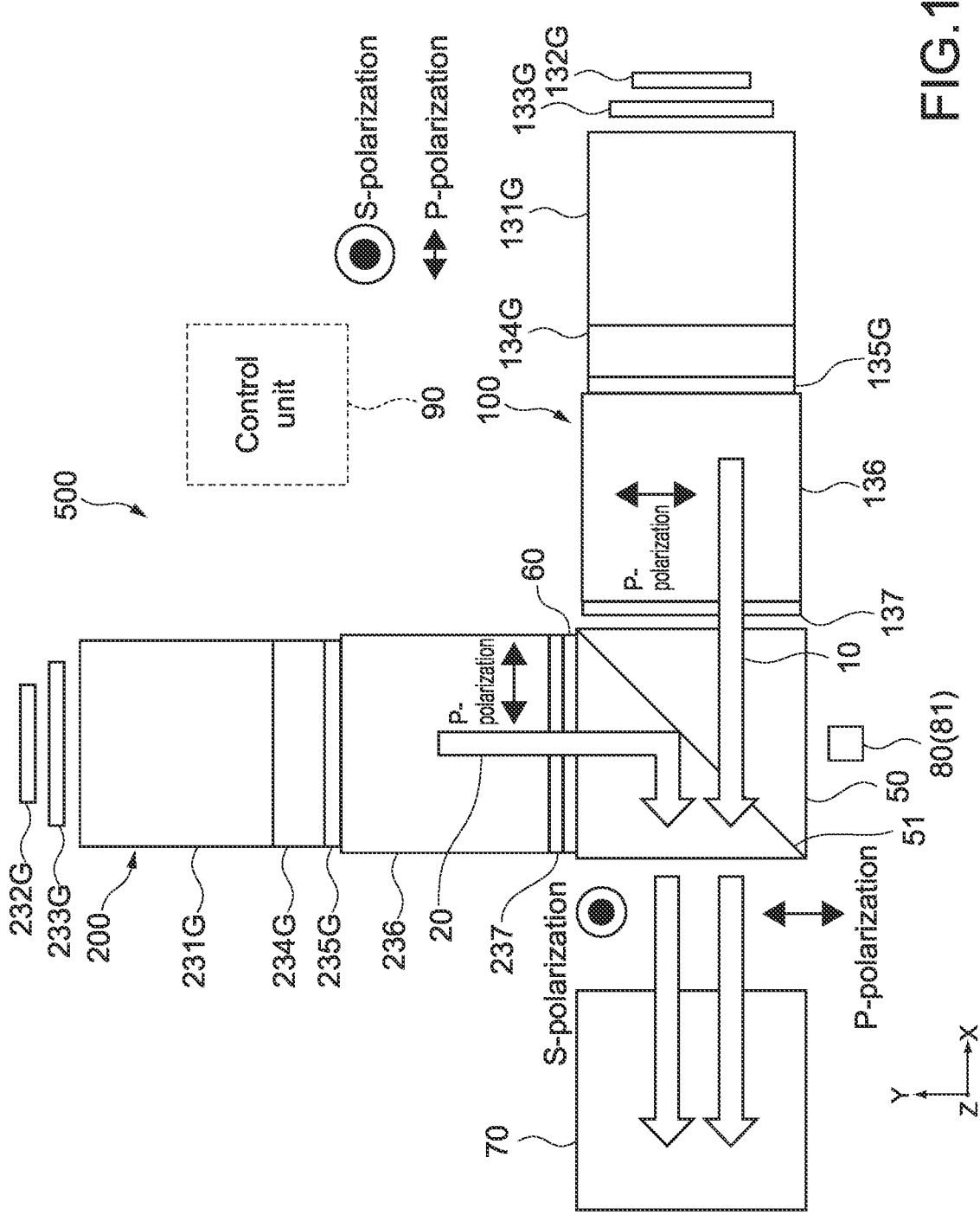
FIG. 1 A schematic diagram showing a configuration example of an image display apparatus according to an embodiment of the present technology.

FIG. 1 is a schematic diagram showing a configuration example of an image display apparatus according to an embodiment of the present technology. An image display apparatus 500 is a cinema projector using a laser light source and is capable of displaying a 3D (stereoscopic) picture by utilizing polarized light characteristics of light.

Hereinafter, for the sake of convenience, as the image display apparatus 500 is viewed from above, a description will be made assuming that the X direction in the figure is left and right directions, the Y direction is a depth direction, and the Z direction is a height direction. As a matter of course, the respective directions of XYZ are not limited to those directions and the image display apparatus 500 can be used in arbitrary direction and orientation.

The image display apparatus 500 includes a first image generator 100, a second image generator 200, an image combining unit 50, a half-wave plate 60, a projection optical system 70, a sensor unit 80, and a control unit 90.

The first image generator 100 generates and emits a first image light beam 10 that constitutes a right-eye image in a 3D picture. The first image generator 100 modulates a light beam for each of a red light beam, a green light beam, and a blue light beam (respective RGB color light beams) and combines the modulated light beams of the respective colors. In this manner, the first image generator 100 generates the first image light beam 10. It should be noted that the modulated light beams of the respective colors are also a concept included in an image light beam.

As shown in FIG. 1, the first image generator 100 emits the first image light beam 10 to the left in the X direction.

Further, the first image generator 100 emits the first image light beam 10 as being a P-polarized light beam with respect to the junction surface 51 of the image combining unit 50.

In this embodiment, the first image generator 100 corresponds to a first emitter. Further, the X direction corresponds to a first direction. Further, the state of being a P-polarized light beam with respect to the junction surface 51 corresponds to a first polarization state.

The second image generator 200 emits a second image light beam 20 that constitutes a left eye image in the 3D picture. The second image generator 200 modulates a light beam for each of respective RGB color light beams and combines the modulated light beams of the respective colors to thereby generate the second image light beam 20.

As shown in FIG. 1, the second image generator 200 emits the second image light beam 20 to the front (in the figure, downwards) in the Y direction. Further, the second image generator 200 emits the second image light beam 20 as being a P-polarized light beam with respect to the junction surface 51 of the image combining unit 50.

The first and second image generators 100 and 200 have substantially the same configuration. In FIG. 1, some components are schematically shown regarding each of the first and second image generators 100 and 200. Each of the first and second image generators 100 and 200 will be described later in detail.

The half-wave plate 60 is disposed between the second image generator 200 and the image combining unit 50. The half-wave plate 60 has a function of rotating the polarization direction by 90 degrees over the entire wavelength band of the three primary colors of light to be used. A specific configuration of the half-wave plate 60 is not limited and may be arbitrarily designed.

The half-wave plate 60 rotates the polarization direction of the second image light beam 20 emitted from the second image generator 200 by 90 degrees. Therefore, the second image light beam 20 as being an S-polarized light beam with respect to the junction surface 51 is emitted by the image combining unit 50.

In this embodiment, the second image generator 200 and the half-wave plate 60 correspond to a second emitter. Further, the Y direction corresponds to a second direction substantially orthogonal to the first direction. Further, the state of being an S-polarized light beam with respect to the junction surface 51 corresponds to a second polarization state.

The image combining unit 50 is a prism-type beam splitter. The image combining unit 50 has characteristics of a polarization beam splitter having high reflectance with respect to an S-polarized light beam and having high transmittance with respect to a P-polarized light beam over the entire wavelength range of the three primary colors of light to be used.

In this embodiment, two right-angled isosceles prisms of substantially the same type are joined and a polarization film having predetermined optical characteristics on the junction surface 51 is formed. The junction surface 51 is disposed at an angle of 45 degrees with respect to a travelling direction of each of the first image light beam 10 and the second image light beam 20 and these S-polarized light beam and P-polarized light beam with respect to the junction surface 51 are defined.

The junction surface 51 transmits the first image light beam 10 which is a P-polarized light beam and reflects the second image light beam 20 which is an S-polarized light beam. Accordingly, the first and second image light beams 10 and 20 are combined and are emitted toward the projection optical system 70. Therefore, in this embodiment, the right-eye image is displayed by the first image light beam 10 which becomes a P-polarized light beam with respect to the junction surface 51 and the left eye image is displayed by the second image light beam 20 which is an S-polarized light beam.

In this embodiment, the image combining unit 50 corresponds to an optical device. This point will be described later in detail.

The projection optical system 70 is disposed on an emitter side of the image combining unit 50. The first and second image light beams 10 and 20 combined by the image combining unit 50 are enlarged at a predetermined scale magnification and are projected to a projecting object such as a screen. Accordingly, the right-eye image and the left-surface image are displayed. The projection optical system 70 includes a plurality of projection lenses and the like, for example. A specific configuration of the projection optical system 70 may be designed as appropriate.

The sensor unit 80 includes a sensor 81 that receives light and is capable of detecting a state of a light beam. The state of the light beam includes, for example, luminance (intensity), chromaticity, a luminous flux shape, and the like. It should be noted that the luminous flux shape is a concept including the size (cross-sectional area) of the luminous flux.

An arbitrary luminance sensor, a chromaticity sensor, or the like may be used as the sensor 81. Further, an image sensor such as an array sensor, a CMOS sensor, and a CCD sensor constituted by a plurality of sensors may be used as the sensor 81.

As shown in FIG. 1, the sensor 81 is disposed in proximity to a surface on a front side (in the figure, lower side) of the image combining unit 50. The sensor 81 enables a state of each of the first and second image light beams 10 and 20 to be detected with high accuracy. This point will be described later in detail.

The control unit 90 controls the operations of the respective mechanisms in the image display apparatus 500. The control unit 90 is electrically connected to the first and second image generators 100 and 200, the projection optical system 70, and the other mechanisms and outputs a control signal to the respective mechanisms. For example, the operations of the light source section and the optical modulator included in the first and second image generators 100 and 200 can be controlled.

The control unit 90 includes, for example, a CPU, a RAM, a ROM, and the like. The CPU loads a control program recorded in the ROM in advance into the RAM and executes the control program. In this manner, the respective mechanisms are controlled. The configuration of the control unit 90 is not limited and arbitrary hardware and software may be used. For example, devices including a programmable logic device (PLD) of a field programmable gate array (FPGA) or the like, an application specific integrated circuit (ASIC), and the like may be used. Further, although the control unit 90 is shown by the broken line in FIG. 1, the position at which the control unit 90 is disposed and the like are also not limited and may be set as appropriate.

[Image Generator]

Figure 2:
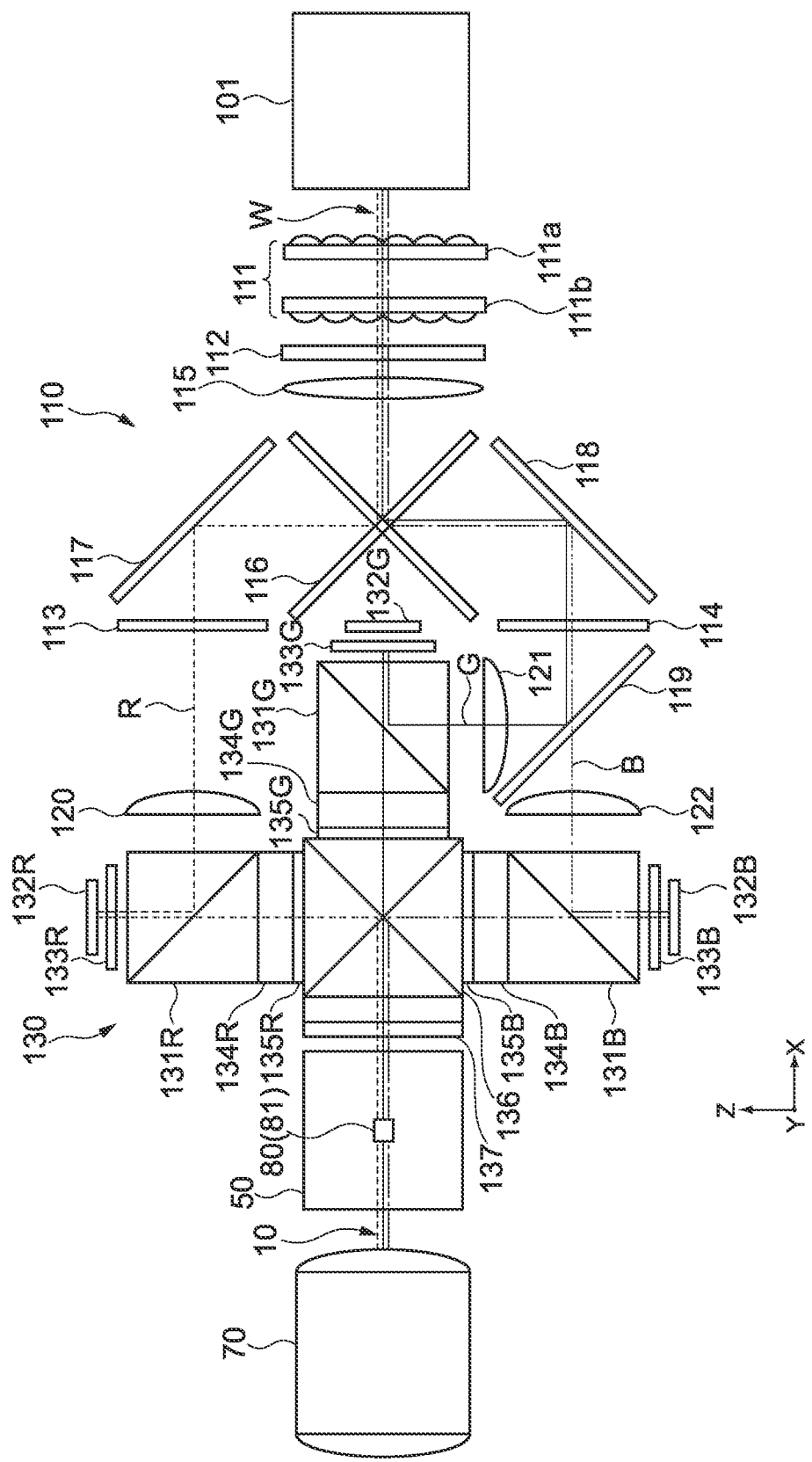
FIG. 2 A schematic diagram showing a configuration example of an image generator.

FIG. 2 is a schematic diagram showing a configuration example of the image generator. FIG. 2 shows a configuration example of the first image generator 100 in a case where the image display apparatus 500 shown in FIG. 1 is viewed from the front side in the Y direction. The half-wave plate 60 and the second image generator 200 shown in FIG. 1 are located on a deep side of the image combining unit 50 shown in FIG. 2 and the illustration is omitted.

The first image generator 100 includes a light source section 101, an illumination optical system 110, and an image modulating unit 130. The light source section 101 generates a white light beam W and emits the generated white light beam W to the illumination optical system 110. A solid-state light source such as a light emitting diode (LED) and a laser diode (LD), a mercury lamp, a xenon lamp, or the like is disposed at the light source section 101, for example.

For example, a solid-state RGB light source capable of emitting each of light beams of the respective RGB colors may be used, those emitted light beams may be combined, and the white light beam W may be generated. Alternatively, a solid-state light source that emits light in the blue wavelength range and fluorescent phosphor that is excited by a blue light beam and emits a yellow light beam may be disposed. In this case, the blue light beam and yellow light beam are combined and the white light beam W is emitted.

The illumination optical system 110 includes an integrator device 111, polarization converters 112, 113, and 114, a light collection lens 115, a cross-dichroic mirror 116, reflection mirrors 117 and 118, a dichroic mirror 119, and relay lenses 120, 121, and 122.

The integrator device 111 includes first and second fly eye lenses 111a and 111b. The white light beam W passes through those first and second fly eye lenses 111a and 111b. In this manner, nonuniformity of luminance of the white light beam W is lowered.

The polarization converter 112 has a function of adjusting the polarization state of the white light beam W that enters it via the integrator device 111. An arbitrary optical device such as a polarization plate and a polarization beam splitter may be used as the polarization converter 112. The white light beam W passing through the polarization converter 112 is emitted to the cross-dichroic mirror 116 via the light collection lens 115.

The cross-dichroic mirror 116 splits the white light beam W emitted from the light collection lens 115 into a red light beam R having a longer wavelength and a green light beam G and a blue light beam B having a shorter wavelength. The red light beam R split by the cross-dichroic mirror 116 is reflected by the reflection mirror 117 and enters the polarization converter 113. The red light beam R whose polarization state has been adjusted by the polarization converter 113 is emitted to the image modulating unit 130 via the relay lens 120.

The green light beam G and the blue light beam B split by the cross-dichroic mirror 116 is reflected by the reflection mirror 118 and enters a polarization converter 114. The green light beam G and the blue light beam B whose polarization state has been adjusted by the polarization converter 114 are split by the dichroic mirror 119 into the green light beam G having the longer wavelength and the blue light beam B having the shorter wavelength.

The green light beam G split by the dichroic mirror 119 is emitted to the image modulating unit 130 via the relay lens 121. The blue light beam B split by the dichroic mirror 119 is emitted to the image modulating unit 130 via the relay lens 122.

The image modulating unit 130 includes reflective polarizers 131 (131R, 131G, and 131B), reflective optical modulators 132 (132R, 132G, and 132B), wave plates 133 (133R, 133G, and 133B), polarization beam splitters 134 (134R, 134G, and 134B), and half-wave plates 135 (135R, 135G, and 135B) which are disposed for the respective RGB colors. Further, the image modulating unit 130 includes a color combining prism 136 and a polarization plate 137 for generating the first image light beam 10.

The reflective polarizers 131 are prism-type beam splitters. The respective RGB light beams are emitted from the respective relay lenses 120 to 122 shown in FIG. 2 as being an S-polarized light beam with respect to the junction surface of the reflective polarizers 131.

The reflective polarizer 131R reflects an S-polarized component of the red light beam R toward the wave plate 133R. The wave plate 133R functions as a compensation plate that compensates for black level degradation, rotates the polarization direction of the incident red light beam R, and emits it to the reflective optical modulator 132R. The angle of rotation of the polarization direction is set as appropriate such that a high-accuracy image is projected.

The reflective optical modulator 132R modulates and reflects the incident red light beam R on the basis of an image signal corresponding to the red light beam R supplied from outside. Although a reflective type liquid-crystal panel is typically used as the reflective optical modulator 132R, the present technology is not limited thereto.

The red light beam R modulated by the reflective optical modulator 132R (referred to as a modulated light beam R with the same reference sign) enters the reflective polarizer 131R via the wave plate 133R. A P-polarized light beam component of the modulated light beam R passes through the junction surface and enters the polarization beam splitter 134R.

The polarization beam splitter 134R functions as a polarization converter. With this polarization beam splitter 134R, the polarization state of the modulated light beam R is adjusted and unnecessary light is cut. The polarization direction of the modulated light beam R emitted from the polarization beam splitter 134R is rotated by the half-wave plate 135R by 90 degrees and is emitted to the color combining prism 136.

The green light beam G and the blue light beam B are similarly modulated by the reflective optical modulators 132G and 132B and are emitted to the color combining prism 136 from the reflective polarizers 131G and 131B via the half-wave plates 135G and 135B.

The color combining prism 136 is configured by joining a plurality of glass prisms (four right-angled isosceles prisms of substantially the same type), for example. On the junction surface of each of the glass prisms, two interference films having predetermined optical characteristics are formed.

A first interference film among them reflects the blue light beam B and transmits the red light beam R and the green light beam G. A second interference film reflects the red light beam R and transmits the blue light beam B and the green light beam G. The first and second interference films have characteristics having high reflectance with respect to an S-polarized light beam and having low reflectance with respect to a P-polarized light beam.

In this embodiment, the polarization direction of each of the modulated light beams RGB is rotated by the half-wave plates 135 by 90 degrees. Accordingly, each of the modulated light beams RGB is made incident as an S-polarized light beam with respect to the junction surface of the color combining prism 136. As a result, a high-luminance image can be projected.

The modulated light beams R and B are reflected by the junction surface and the modulated light beam G passes through the junction surface. Accordingly, the modulated light beams RGB are combined on the same optical path and the first image light beam 10 is generated. The polarization direction of the first image light beam 10 is adjusted by the polarization plate 137 and it is emitted to the image combining unit 50.

It should be noted that in this embodiment, the direction of the first image generator 100 is set as appropriate such that a light beam which is an S-polarized light beam with respect to the junction surface of the color combining prism 136 becomes a P-polarized light beam with respect to the junction surface 51 of the image combining unit 50. Therefore, the first image light beam 10 which is a P-polarized light beam with respect to the junction surface 51 of the image combining unit 50 is emitted from the first image generator 100.

As described above, the second image generator 200 has substantially the same configuration as the first image generator 100. The second image generator 200 emits the second image light beam 20 which is a P-polarized light beam with respect to the junction surface 51 of the image combining unit 50. The half-wave plate 60 rotates the polarization direction of the second image light beam 20 by 90 degrees. Accordingly, the second image light beam 20 which is an S-polarized light beam with respect to the junction surface 51 is emitted to the image combining unit 50.

It should be noted that in FIG. 1, the reflective polarizer 131R, the reflective optical modulator 132G, the wave plate 133G, the polarization beam splitter 134G, and the half-wave plate 135G, the color combining prism 136, and the polarization plate 137 of the components of the first image generator 100 are shown in the figure.

Moreover, a reflective polarizer 231R, a reflective optical modulator 232G, a wave plate 233G, a polarization beam splitter 234G, a half-wave plate 235G, a color combining prism 236, and a polarization plate 237 of the components of the second image generator 200 are shown in the figure.

Figure 3:
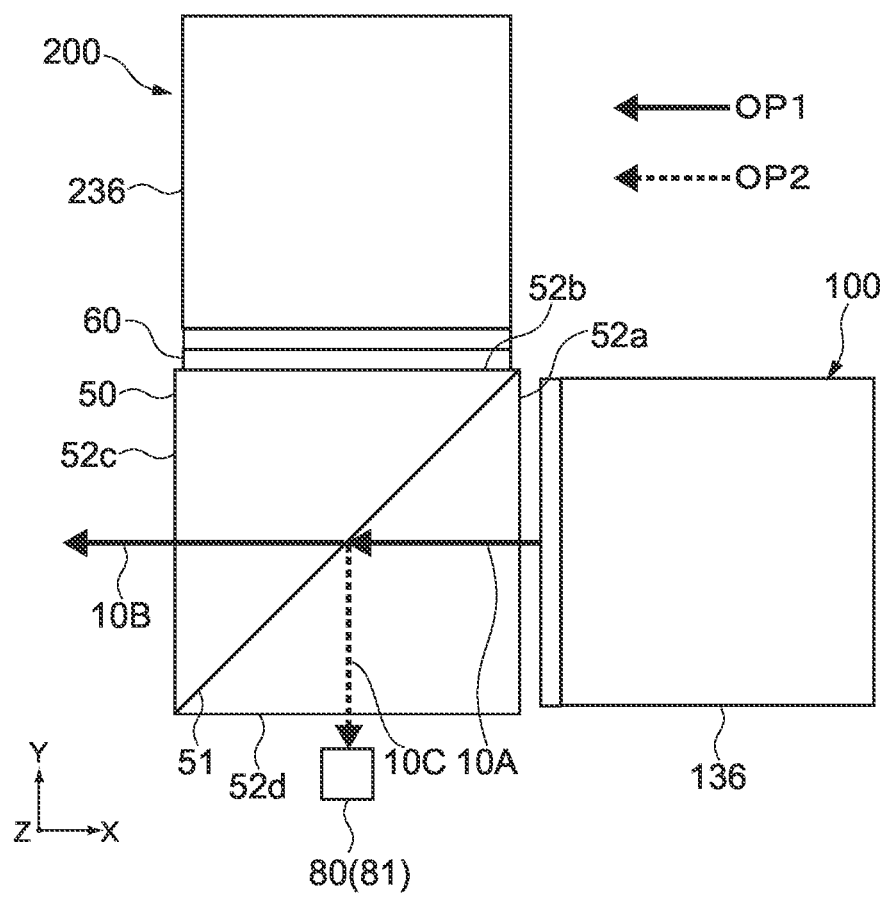
FIG. 3 An enlarged diagram showing a portion of an image combining unit in an enlarged state.
Figure 4:
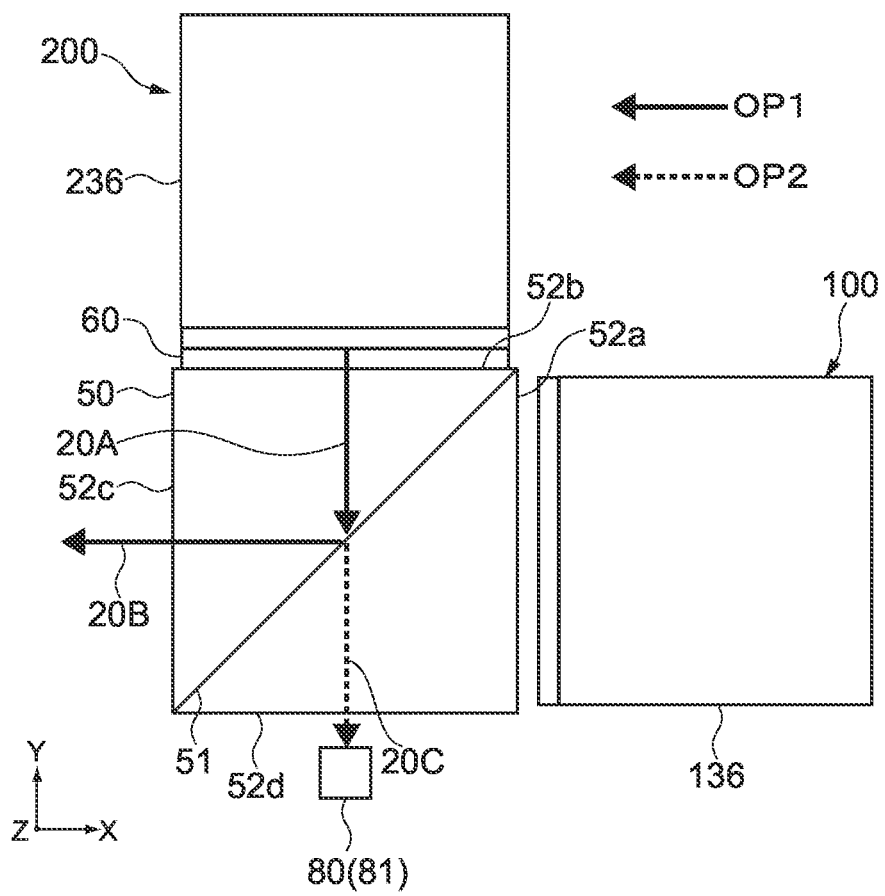
FIG. 4 An enlarged diagram showing the portion of the image combining unit in the enlarged state.

FIGS. 3 and 4 are enlarged diagrams each showing a portion of the image combining unit 50 in an enlarged state. In FIG. 3, behaviors of the first image light beam 10 emitted from the first image generator 100 are schematically shown. In FIG. 4, behaviors of the second image light beam 20 emitted via the half-wave plate 60 from the second image generator 200 are schematically shown.

As shown in FIG. 3, most of a first image light beam 10A which is the P-polarized light beam emitted from the first image generator 100 pass through the junction surface 51 and travel toward the projection optical system 70. The optical path of the first image light beam 10A that enters the junction surface 51 in this X direction and a first image light beam 10B that passes through the junction surface 51 and travels toward the projection optical system 70 also in the X direction is a main optical path OP1.

The main optical path OP1 is the optical path of the image light beam (modulated light beam) until the projection optical system 70 projects the image light beam (modulated light beam) to the screen or the like after the image light beam (modulated light beam) is generated. Therefore, the image combining unit 50 is disposed on the main optical path OP1 of the image light beam (modulated light beam).

On the other hand, the first image light beams 10 emitted from the first image generator 100 also includes a first image light beam 10C reflected to the front (in the figure, downwards) in the Y direction by the junction surface 51. The first image light beam 10C becomes so-called leaking light and travels along another optical path OP2 different from the main optical path OP1.

In this embodiment, the image combining unit 50 functions as an optical device that splits the first image light beam 10A emitted from the first image generator 100 into the first image light beam 10B and the first image light beam 10C, which each travel in a different direction. That is, the image combining unit 50 is disposed on the main optical path OP1 of the first image light beam 10, emits the first image light beam 10B along the main optical path OP1, and emits the first image light beam 10C along the other optical path OP2.

The junction surface 51 of the image combining unit 50 functions as a light-splitting surface disposed obliquely to the direction of incidence (X direction) of the first image light beam 10 that enters the image combining unit 50. Specifically, a surface of the junction surface 51 that the first image light beam 10 enters corresponds to a light-splitting surface.

In this embodiment, the junction surface 51 (light-splitting surface) is disposed at an angle of 45 degrees with respect to the direction of incidence (X direction) of the first image light beam 10. The junction surface 51 transmits the first image light beam 10B which is a part of the first image light beam 10A that enters the junction surface 51 and reflects the first image light beam 10C which is another part of the first image light beam 10A.

The projection optical system 70 projects the first image light beam 10B which travels toward the projection optical system 70 to the screen or the like. In this case, a part of the first image light beam 10B can be reflected by the projection lens or the like in the projection optical system 70.

The reflected light beam reflected by the projection lens or the like backwardly travels on the main optical path OP1 which is the optical path of the first image light beam 10B and enters the junction surface 51 again. The reflected light beam that enters the junction surface 51 again is transmitted toward the first image generator 100 or is reflected toward the second image generator 200. In either case, it does not travel along the other optical path OP2 which is the optical path of the first image light beam 10C.

That is, the image combining unit 50 and the junction surface 51 also have a function of preventing the reflected light beam, which backwardly travels on the main optical path OP1 and enters the image combining unit 50 and the junction surface 51, from travelling along the other optical path OP2. In this embodiment, the first image light beam 10B corresponds to a first split light beam and the first image light beam 10C corresponds to a second split light beam. Further, the main optical path OP1 corresponds to a first optical path and the other optical path OP2 corresponds to a second optical path.

Moreover, the color combining prism 136 of the first image generator 100 corresponds to a combining unit that combines a plurality of modulated light beams and generates a combined modulated light beam (first image light beam 10). Further, the projection optical system 70 corresponds to a projecting unit that projects the combined modulated light beam combined by a color-combining unit. The image combining unit 50 is disposed between the color combining prism 136 and the projection optical system 70 and splits the combined modulated light beam (first image light beam 10A) into the first image light beam 10B and the first image light beam 10C.

As shown in FIG. 3, the sensor unit 80 (sensor 81) is disposed on the other optical path OP2 which is the optical path of the first image light beam 10C and detects a state of the first image light beam 10C. The junction surface 51 of the image combining unit 50 prevents the reflected light beam from the projection optical system 70 from travelling along the other optical path OP2. Therefore, the reflected light beam from the projection optical system 70 does not enter the sensor 81 and it is possible to sufficiently suppress generation of noise components due to the reflected light beam. Accordingly, a state of the first image light beam 10C can be detected with high accuracy and a state of the first image light beam 10A emitted from the first image generator 100 can be detected with high accuracy.

It can be said that the position at which the sensor 81 is disposed is a position on a side of the light-splitting surface that reflects the first image light beam 10C to travel along the other optical path OP2. In a case where the sensor 81 is disposed on a side of the light-splitting surface on a side which the first image light beam 10A enters, the reflected light beam, which enters a surface on an opposite side of the light-splitting surface (on a side of the surface on which the first image light beam 10B is emitted), can be prevented from travelling along the other optical path OP2.

In this embodiment, the image combining unit 50 is configured in such a manner that two right-angled isosceles prisms of substantially the same type are joined. Such a prism-type configuration is a configuration included in the light-splitting prism according to the present technology.

As shown in FIG. 3, four side surfaces parallel to the Z direction of the image combining unit 50 are first to fourth side surfaces 52a to 52d.

The first side surface 52a is a surface which is disposed facing the first image generator 100. The first image light beam 10 is made incident upon that surface. The second side surface 52b is a surface which is disposed facing the second image generator 200. The second image light beam 20 is made incident upon that surface. The third side surface 52c is a surface to which the first image light beam 10B is emitted along the main optical path OP1. The fourth side surface 52d is a surface to which the first image light beam 10C is emitted along the other optical path OP2.

The sensor 81 is disposed on a side of the fourth side surface 52d to which the first image light beam 10C is emitted. Specifically, the sensor 81 is disposed in proximity to the fourth side surface 52d. The sensor 81 may be held in contact with the fourth side surface 52d or may be spaced apart from the fourth side surface 52d.

By employing a configuration of a prism type as the image combining unit 50, it becomes easy to attach the sensor 81. In this embodiment, the first side surface 52a corresponds to a first surface. The fourth side surface 52d corresponds to a second surface and a second emitting surface. The third side surface 52c corresponds to a first emitting surface.

Moreover, most of the first image light beam 10A that enters the junction surface 51 travel along the main optical path OP1 as the first image light beam 10B. Then, the first image light beam 10C which is other part travels along the other optical path OP2. That is, the junction surface 51 of the image combining unit 50 splits the first image light beams 10B and 10C such that the amount of light of the first image light beam 10B is larger than the amount of light of the first image light beam 10C. Accordingly, it is possible to sense the first image light beam 10 while sufficiently reducing the loss of the amount of light of the image to be projected. It should be noted that the leaking light is utilized as an object to be sensed, and thus the loss of the amount of light is little even in comparison with the conventional one.

As shown in FIG. 4, most of the second image light beam 20 which is the S-polarized light beam emitted from the second image generator 200 via the half-wave plate 60 are reflected by the junction surface 51 and travels toward the projection optical system 70. Optical paths of a second image light beam 20A that enters the junction surface 51 in this Y direction and a second image light beam 20B which is reflected by the junction surface 51 in the X direction and travels toward the projection optical system 70 become the main optical path OP1.

In this embodiment, the optical path of the second image light beam 20B is substantially identical to the optical path of the first image light beam 10B shown in FIG. 3. Therefore, at the stages subsequent to the junction surface 51, the first image light beam 10B and the second image light beam 20B travel along the same main optical path OP1.

On the other hand, the second image light beam 20 emitted from the second image generator 200 also includes a second image light beam 20C which passes through the junction surface 51 in the Y direction. The second image light beam 20C becomes a so-called leaking light beam and travels along the other optical path OP2 different from the main optical path OP1.

In this embodiment, the optical path of the second image light beam 20C is substantially identical to the optical path of the first image light beam 10C shown in FIG. 3. Therefore, the first image light beam 10C and the second image light beam 20C travel along the same other optical path OP2.

The image combining unit 50 functions as an optical device that splits the second image light beam 20A emitted from the second image generator 200 into the second image light beam 20B and the second image light beam 20C, which each travel in a different direction. That is, the image combining unit 50 is disposed on the main optical path OP1 of the second image light beam 20, emits the second image light beam 20B along the main optical path OP1, and emits the second image light beam 20B along the other optical path OP2.

The junction surface 51 of the image combining unit 50 also functions as a light-splitting surface disposed obliquely to the direction of incidence (Y direction) of the second image light beam 20 that enters the image combining unit 50. Specifically, a surface of the junction surface 51 that the second image light beam 20 enters corresponds to the light-splitting surface. That is, the light-splitting surface with respect to the first image light beam 10 and the light-splitting surface with respect to the second image light beam 20 are the surfaces opposite to each other.

In this embodiment, the junction surface 51 (light-splitting surface) is disposed at an angle of 45 degrees with respect to the direction of incidence (Y direction) of the second image light beam 20. The junction surface 51 reflects the first image light beam 20B which is a part of the second image light beam 20A that enters the junction surface 51 and reflects the second image light beam 20C which is another part of the second image light beam 20A.

Moreover, the image combining unit 50 and the junction surface 51 prevent the reflected light beam, which backwardly travels on the main optical path OP1 and enters the image combining unit 50 and the junction surface 51, from travelling along the other optical path OP2. That is, also regarding the second image light beam 20, the reflected light beam reflected by the projection optical system 70 is prevented from travelling along the other optical path OP2. It should be noted that the second image light beam 20B corresponds to the first split light beam and the second image light beam 20C corresponds to the second split light beam. Further, the main optical path OP1 corresponds to the first optical path and the other optical path OP2 corresponds to the second optical path.

Moreover, a color combining prism 236 of the second image generator 200 corresponds to the combining unit that combines a plurality of modulated light beams to generate a combined modulated light beam (second image light beam 20). The image combining unit 50 is disposed between the color combining prism 236 and the projection optical system 70 and splits the combined modulated light beam (second image light beam 20A) into the second image light beam 10B and the second image light beam 10C.

As shown in FIG. 4, the sensor unit 80 (sensor 81) is disposed on the other optical path OP2 which is the optical path of the second image light beam 20C and detects a state of the second image light beam 10C. The junction surface 51 of the image combining unit 50 prevents the reflected light beam from the projection optical system 70 from travelling along the other optical path OP2. Therefore, the reflected light beam from the projection optical system 70 does not enter the sensor 81 and generation of noise components due to the reflected light beam can be sufficiently suppressed. Accordingly, the second image light beam 20C can be detected with high accuracy and the second image light beam 20A emitted from the second image generator 200 can be detected with high accuracy.

That is, in this embodiment, with respect to the junction surface 51 of the image combining unit 50, the sensor 81 is disposed on the other optical path OP2 configured to be on a side opposite to the main optical path OP1. Accordingly, the first image light beam 10 in the P-polarization state and the second image light beam 20 in the S-polarization state can be respectively sensed with high accuracy.

Note that it can be said that the position at which the sensor 81 is disposed is a surface on a side on which the second image light beam 20C is emitted along the other optical path OP2, i.e., a position on a side of a surface on an opposite side of the light-splitting surface. In a case where the sensor 81 is arranged on the side of the surface on an opposite side of the light-splitting surface, the reflected light beam, which enters the light-splitting surface on a side on which the second image light beam 20B is reflected, can be prevented from travelling along the other optical path OP2.

As in FIG. 3, four side surfaces parallel to the Z direction of the image combining unit 50 are the first to fourth side surfaces 52a to 52d. The sensor 81 is disposed on the side of the fourth side surface 52d to which the second image light beam 20C is emitted. Specifically, the sensor 81 is disposed in proximity to the fourth side surface 52d. In this embodiment, the second side surface 52b corresponds to the first surface. The fourth side surface 52d corresponds to the second surface and the second emitting surface. The third side surface 52c corresponds to the first emitting surface.

Moreover, most of the second image light beam 20A that enters the junction surface 51 are reflected as the second image light beam 20B and travel along the main optical path OP1. Then, the second image light beam 20C which is the other part passes along the other optical path OP2. That is, the junction surface 51 of the image combining unit 50 splits the second image light beams 20B and 20C such that the amount of light of the second image light beam 20B is larger than the amount of light of the second image light beam 20C. Accordingly, the second image light beam 20 can be sensed while sufficiently suppressing the loss of the amount of light of the image to be projected. It should be noted that the leaking light is utilized as an object to be sensed, and thus the loss of the amount of light is little even in comparison with the conventional one.

Figure 5:
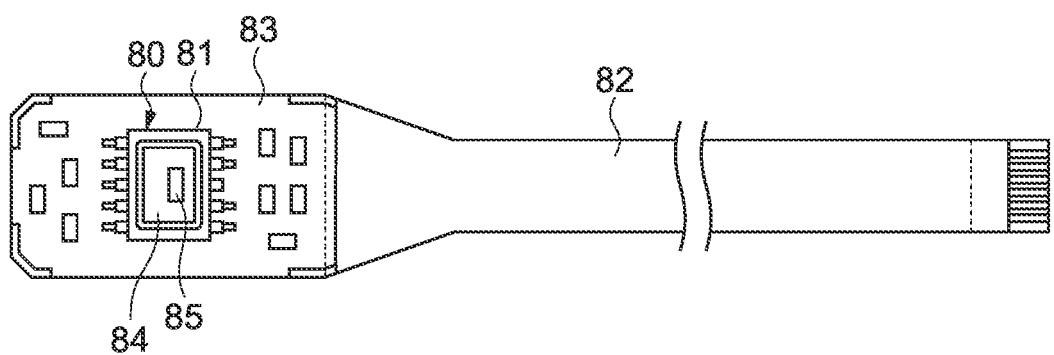
FIG. 5 A schematic diagram showing a configuration example of a sensor unit.
Figure 6:
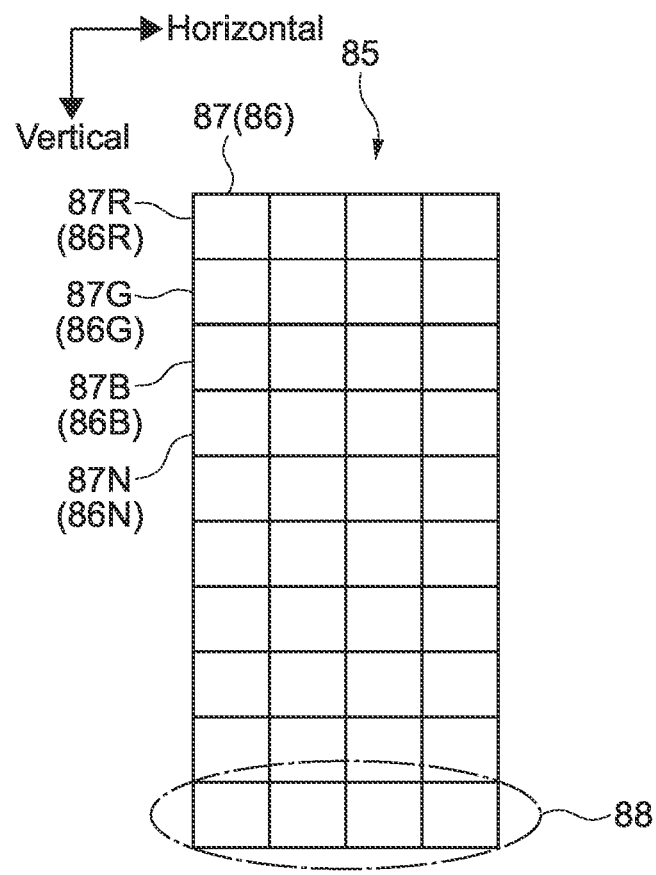
FIG. 6 A schematic diagram showing a configuration example of the sensor unit.

FIGS. 5 and 6 are schematic diagrams each showing a configuration example of the sensor unit 80. The sensor unit 80 illustrated in FIGS. 5 and 6 includes a circuit board 83 connected to a flexible circuit board 82 and the sensor 81 mounted on the circuit board 83. A signal of light intensity measured by the sensor 81 is output to the control unit 90 or the like in FIG. 1 via the circuit board 83 and the flexible circuit board 82. Further, the sensor 81 and the circuit board 83 are supplied with a control signal and driving power.

The sensor 81 includes a light-receiving surface 84 and a part of the light-receiving surface 84 is set as a measurement area 85 (Active Area). FIG. 6 is a schematic diagram showing the measurement area 85 of the sensor 81. The sensor 81 includes a plurality of measurement units 86 capable of measuring intensity of an incident light beam. That is, the plurality of measurement units 86 is arranged in the measurement area 85. The plurality of measurement units 86 is arranged in a two-dimensional form in directions orthogonal to each other. In this embodiment, a total of 40 measurement units 86 of 4 (horizontal) by 10 (vertical) are arranged in a matrix form.

Moreover, the sensor 81 includes a plurality of filters 87 each disposed at each of the plurality of measurement units 86. The plurality of filters 87 transmits light beams in a predetermined wavelength range. That is, the filters 87 are arranged corresponding to the 40 measurement units 86, respectively. In this embodiment, the plurality of filters 87 includes, as three types of filters, a red filter 87R that transmits light in the red wavelength range, a green filter 87G that transmits light in the green wavelength range, and a blue filter 87B that transmits light in the blue wavelength range.

When the first and second image light beams 10C and 20C are made incident upon the measurement area 85, the measurement unit 86 in which the red filter 87R is disposed measures intensity of the modulated red light beam R. Similarly, the measurement unit 86 in which the green filter 87G is disposed measures intensity of the modulated green light beam G. The measurement unit 86 in which the blue filter 87B is disposed measures intensity of the modulated blue light beam B. For example, a mean value of intensity measured by the plurality of measurement units 86 in which the filters 87 for the same color are disposed is used.

As shown in FIG. 6, the plurality of filters 87 is disposed such that a filter group 88 arranged in the x direction includes three types of filters 87R, 87G, and 87B of red, green, and blue. Further, the plurality of filters 87 is disposed such that the filters 87 of the same kind among the three types of filters 87R, 87G, and 87B are not adjacent in the second direction. Accordingly, the three types of filters 87R, 87G, and 87B can be uniformly arranged in the measurement area 85. As a result, modulated light intensity of the respective RGB colors can be accurately measured. It should be noted that the arrangement method of the three types of filters 87R, 87G, and 87B are not limited to the one shown in FIG. 6 and may be set as appropriate.

Moreover, in this embodiment, the plurality of filters 87 includes noise filters 87N. The noise filters 87N transmit light of noise components, which are respectively transmitted by the three types of filters 87R, 87G, and 87B of red, green, and blue. That is, the noise filters 87N transmit light of noise components passing through the red filter 87R, light of noise components passing through the green filter 87G, and light of noise components passing through the blue filter 87B.

The noise filters 87N detect light in a wavelength range of about 200 nm to about 660 nm at low sensitivity of about 1 to 5%. Therefore, the measurement unit 86 (hereinafter, referred to as a noise measurement unit) in which the noise filters 87N are disposed is capable of measuring light intensity detected as light of noise components by the measurement units 86 of the respective colors. The intensity of light of noise components, which is measured by the noise measurement units 86, is subtracted from the respective RGB light intensity, which has been measured by the measurement units 86R, 86G, and 86B of the respective colors. In this manner, the modulated light intensity of the respective colors can be measured with high accuracy.

As shown in FIG. 6, the noise filters 87N are disposed such that at least one of them is included in the filter group 88 arranged in the horizontal direction. Further, the noise filters 87N are disposed not to be adjacent in the vertical direction. Accordingly, the noise filters 87N can be uniformly arranged in the measurement area 85, and the modulated light intensity of the respective RGB colors can be accurately measured.

It should be noted that in this embodiment, noise components resulting in the reflected light beam from the projection optical system 70 are sufficiently reduced. Therefore, a more accurate image can be projected even without using the noise filters 87N. As a matter of course, much more accurate image may be projected by using the noise filters 87N.

In this embodiment, when a measurement mode of the first and second image light beams 10 and 20 is selected, the control unit 90 shown in FIG. 1 switches between emission of the first image light beam 10 by the first image generator 100 and emission of the second image light beam 20 by the second image generator 200 as appropriate for performing it.

For example, in a state in which the emission operation by the second image generator 200 is turned off, the first image generator 100 emits an image light beam for measurement (a concept included in the first image light beam 10). The image light beam for measurement is an image light beam for projecting a white image, a black image, and another arbitrary image, for example. It should be noted that the operation of projecting an image light beam also includes an operation of preventing projection of an image light beam in a case of displaying a black image or the like. Further, an image light beam of an content image or the like to be an object to be viewed may be emitted. The sensor unit 80 detects a state of the image light beam for measurement and the detection result is output to the control unit 90.

After that, in the state in which the emission operation of the first image generator 100 is turned off, the second image generator 200 emits an image for measurement (a concept included in the second image light beam 20). The sensor unit 80 detects a state of the image for measurement and the detection result is output to the control unit 90.

The timing for selecting the measurement mode is not limited. For example, the measurement mode may be automatically selected in accordance with the timing at which the user activates the image display apparatus 500 or the timing at which an instruction to terminate driving of the image display apparatus 500 is input. For example, there can be a case of performing measurement in accordance with a timing at which a logo mark of a maker or the like at the time of activation is displayed, a case of displaying a black screen on a stand-by mode until the termination of driving is completed and performing measurement, and the like. As a matter of course, the user may input an instruction to perform measurement and select the measurement mode in accordance with that input instruction.

The control unit 90 detects the luminance (intensity), the chromaticity, and the luminous flux shape, and the like of the first and second image light beams 10 and 20 on the basis of a state of the image light beam for measurement emitted from each of the first and second image generators 100 and 200. That is, in this embodiment, the control unit 90 also functions as a part of the sensor unit 80.

For example, calibration is performed on the basis of the state of the image light beam for measurement of each of them. The calibration enables measurement and correction of white balance (white chromaticity) and measurement and correction of a color space, i.e., measurement and correction of single color chromaticity of RGB to be performed with high accuracy, for example. Further, various types of processing such as measurement and correction of gamma can be performed. For example, in a case where the image display apparatus 500 includes a luminance sensor that adjusts the luminance of an image in accordance with surrounding brightness, correction and the like of the luminance adjustment function by that luminance sensor can also be performed.

Moreover, balance of the luminance, chromaticity, and the like of the right-eye image and the left-surface image can also be adjusted. Other processing and the like based on the detection result of the sensor unit 80 will be described later with effects of the image display apparatus 500 according to this embodiment.

Figure 7:
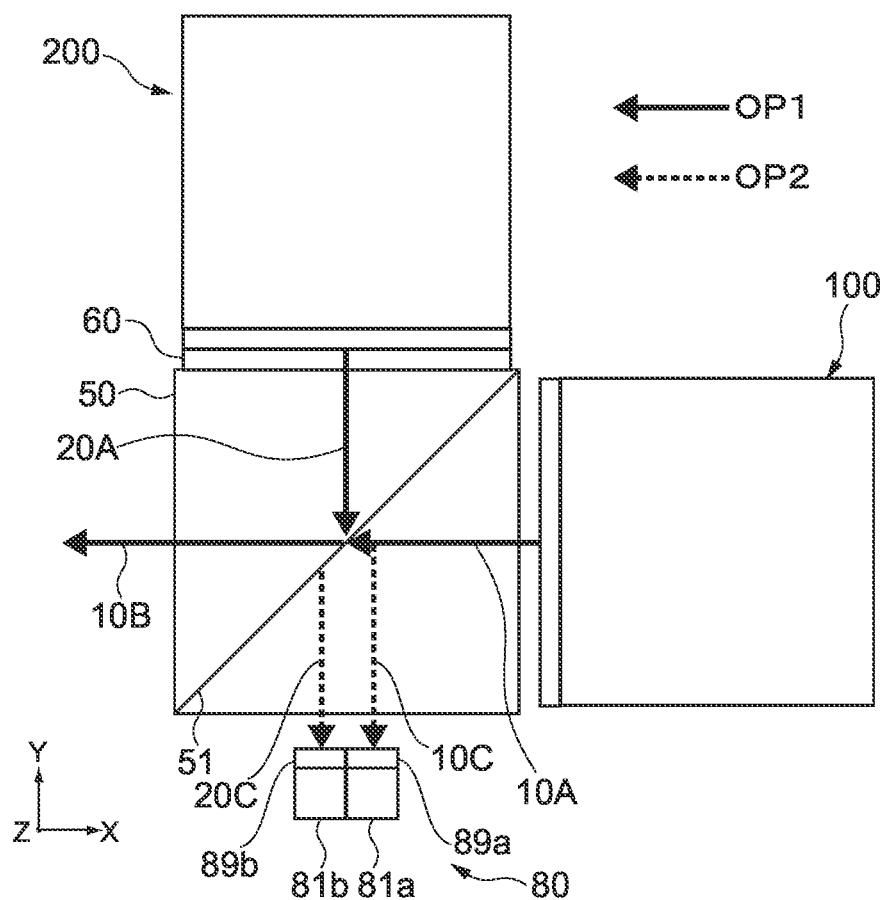
FIG. 7 A schematic view showing another configuration example of the sensor unit.

FIG. 7 is a schematic view showing another configuration example of the sensor unit 80. The sensor unit 80 shown in FIG. 7 includes a first polarization plate 89a that transmits a light beam to become a P-polarized light beam with respect to the junction surface 51 of the image combining unit 50 and prevents light beams in other polarization states from travelling through the first polarization plate 89a, and a first sensor 81a that detects the light beam in the P-polarization state that passes through the first polarization plate 89a.

Moreover, the sensor unit 80 includes a second polarization plate 89b that transmits a light beam to become an S-polarized light beam with respect to the junction surface 51 of the image combining unit 50 and prevents light beams in other polarization states from travelling through the second polarization plate 89b, and a second sensor 81b that detects the light beam in the S-polarization state that passes through the second polarization plate 89b.

The first image light beam 10C emitted from the first image generator 100 enters the first sensor 81a via the first polarization plate 89a. The second image light beam 20C emitted from the second image generator 200 enters the second sensor 81b via the second polarization plate 89b. Therefore, in the sensor unit 80 shown in FIG. 7, the states of the first and second image light beams 10 and 20 can be detected at the same time without switching the emission operation of each of the first and second image generators 100 and 200.

Accordingly, for example, without setting the measurement mode, the states of the first and second image light beams 10 and 20 can be constantly detected also in projection of the content image or the like. As a result, a very highly accurate image can be projected by constantly feeding back detection results.

In the example shown in FIG. 7, the first polarization plate 89a corresponds to a first filter that extracts the light beam in the first polarization state and the second polarization plate 89b corresponds to a second filter that extracts a light beam in the second polarization state. As a matter of course, other optical components other than the wave plate may be used.

As still another configuration example, one sensor may be arranged and a polarization device such as a polarization plate may be rotatably arranged in front thereof. Control of the rotational angle of the polarization device as appropriate enables the first and second image light beams 10 and 20 to be switched as appropriate to enter the sensor. Output of the result detected by the sensor and the rotational angle of the polarization device to the control unit 90 in association with each other enables whether the detection result relates to the first image light beam 10 or the second image light beam 20 to be easily determined. Even with this configuration, the states of the first and second image light beams 10 and 20 can be constantly detected also in projection of the content image or the like without setting the measurement mode.

Figure 8:
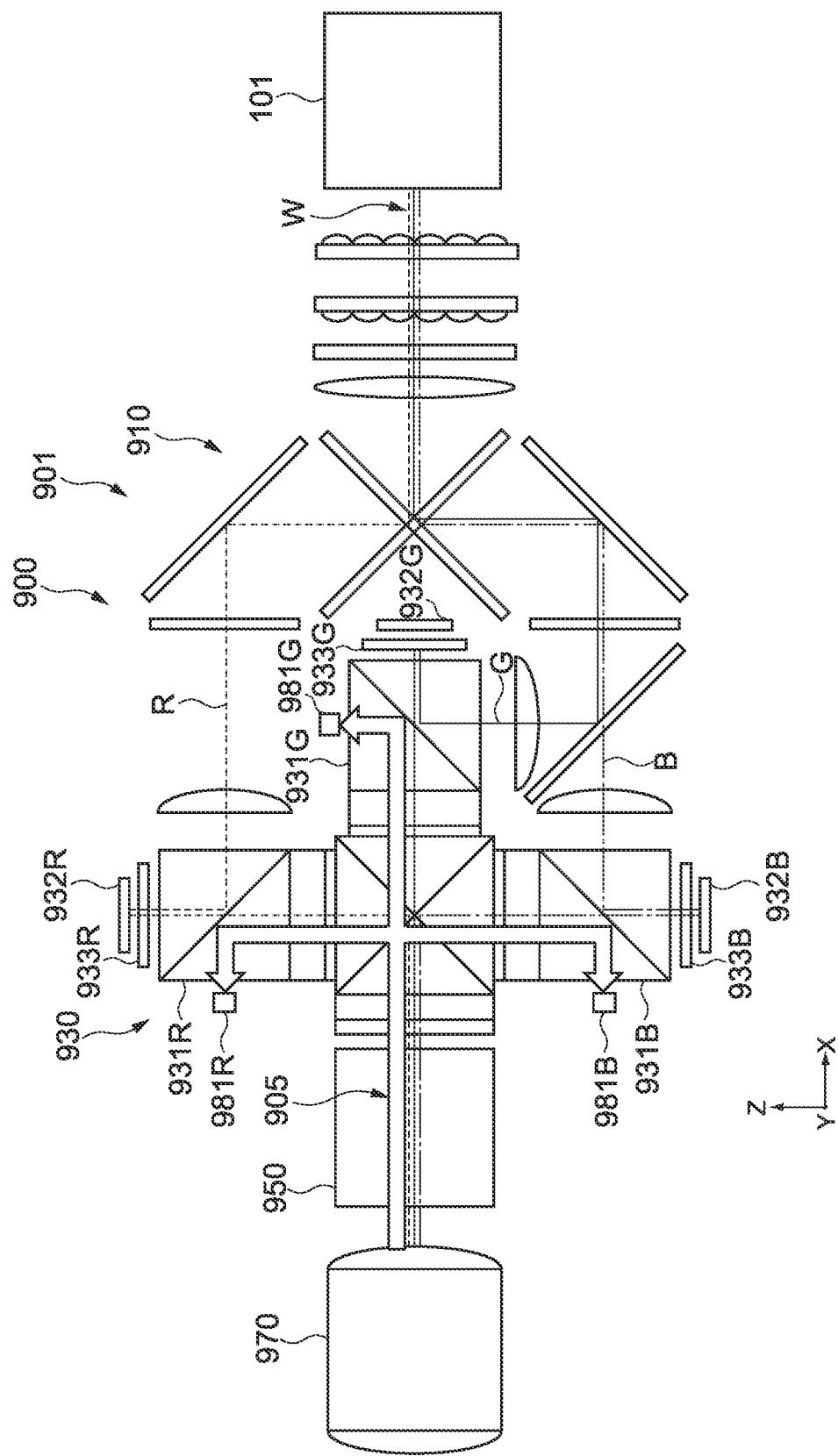
FIG. 8 A schematic diagram showing a configuration example of an image display apparatus shown as an comparative example.

FIG. 8 is a schematic diagram showing a configuration example of an image display apparatus 900 shown as a comparative example. In the image display apparatus 900 as the comparative example, sensors 981 (981R, 981G, and 981B) are disposed in vicinity of reflective polarizers 931 (931R, 931G, and 931B) (prism-type beam splitters) for the respective RGB colors, which are included in a first image generator 901.

Specifically, the sensors 981 are disposed in proximity to surfaces of the reflective polarizers 931, which are opposite to surfaces which the respective RGB light beams enter. The sensors 981 for the respective RGB colors detect states of leaking light of the respective color light beams that has not been reflected by the reflective polarizers 931 and has passed through the reflective polarizers 931.

Hereinafter, effects exerted by the image display apparatus 500 according to this embodiment will be described as compared to the configuration of the image display apparatus 900 shown in FIG. 8.

(Sensing Accuracy)

As shown in FIG. 8, in the image display apparatus 900, reflected light beams 905 reflected by a projection optical system 970 backwardly travel on the main optical path of the first and second image light beams 10 and 20 and enter the reflective polarizers 931. Then, the reflective polarizers 931 reflect the reflected light beams 905 toward the sensors 981 and the reflected light beams 905 enter the sensors 981. That is, in the image display apparatus 900, interface reflection of projected light beams (image light beams) at the projection lens or the like directly enters the sensors 981, and thus noise components significantly increase. As a result, the sensing accuracy of the sensors 981 is significantly lowered.

In contrast, in the image display apparatus 500 according to this embodiment, the reflected light beam from the projection optical system 70 does not enter the sensor 81 and generation of noise components due to the reflected light beam can be sufficiently suppressed. Accordingly, high sensing accuracy can be achieved.

(Correlation with Projected Light Beam)

In the image display apparatus 900 shown in FIG. 8, only light beams before they are modulated by reflective optical modulators 932 can be sensed. That is, light beams different from image light beams projected by the projection optical system 70 are sensed at a position significantly spaced apart from the projection optical system 70. Therefore, the sensing accuracy consequently lowers by sensing light beams having low correlation with projected light beams (image light beams).

In contrast, in the image display apparatus 500 according to this embodiment, the sensor unit 80 is disposed in vicinity of the image combining unit 50 disposed just in front of the projection optical system 70. Then, the first and second image light beams 10 and 20 generated by the first and second image generators 100 and 200 are sensed. Therefore, light beams having high correlation with projected light beams (image light beams) projected by the projection optical system 70 can be sensed and high sensing accuracy can be achieved. Further, very high sensing accuracy can be achieved even in comparison with a case of sensing a diffracted light beam or the like of projected light beams.

(Degradation Detection of Optical Members)

In the image display apparatus 900 shown in FIG. 8, light beams before they enter the reflective optical modulators 932 are sensed. Therefore, degradation of optical members included in an image modulating unit 930 such as the reflective optical modulators 932 cannot be detected on the basis of the sensing result.

In contrast, in the image display apparatus 500 according to this embodiment, the first and second image light beams 10 and 20 emitted from the first and second image generators 100 and 200 are sensed. That is, light beams passing through the reflective polarizers 131, the reflective optical modulators 132, the wave plates 133, the polarization beam splitters 134, the half-wave plates 135, the color combining prism 136, and the polarization plate 137 included in the image modulating unit 130 illustrated in FIG. 2 are sensed.

Therefore, degradation of those optical components can be detected on the basis of the sensing result of the sensor unit 80. As a matter of course, degradation and the like of an adhesive to be used for coating formed on the optical components, adhesion of the optical components, and the like can also be detected. For example, on the basis of a detection result such as black level degradation and lowering of the white luminance, degradation of the reflective optical modulators 132, the wave plates 133 that functions as compensation plates, the polarization beam splitters 134 that adjusts the polarization state, or the like can be detected as appropriate.

As a result, for example, an optical component can be replaced at a suitable timing, and the maintenance cost and the like can be reduced. Further, a new optical component for replacement can be prepared as appropriate before the optical component is completely broken, for example. That is, the repairing period can be reduced by preparing a component for replacement in advance for expected failure.

(Adjustment of Compensation Plate by Feed-Back of Black Luminance)

The image display apparatus 500 according to this embodiment can also be provided with a mechanism capable of rotating the shafts of the wave plates 133 that functions as the compensation plates through a motor and the like. In this case, the shafts of the wave plates 133 can be rotated by feed-back of the black luminance detected by the sensor unit 80. Accordingly, contrast degradation due to deviation of the compensation plates can be prevented. Alternatively, lowering of the contrast caused by degradation of the other optical members can also be compensated. The adjustment of the compensation plates may be automatically performed or may be performed in accordance with a user's operation via a remote controller or the like.

The positions, angles, and the like of the other optical components may be changed on the basis of the sensing result of the sensor unit 80. By constituting an adjustment mechanism and the like inside the image display apparatus 500 as appropriate, high-accuracy image display based on the sensing result can be performed.

(Sensing of Prism)

The emission operation of each of the first and second image generators 100 and 200 is switched or the sensor unit 80 shown in FIG. 7 is constituted. Accordingly, the white luminance of the color combining prisms 136 and 236 included in the first and second image generators 100 and 200, respectively can be measured. High-accuracy image display can be achieved by controlling the operation of the light source section 101 or the like, for example, on the basis of a measurement result of the white luminance.

(Number of Sensors)

In the image display apparatus 900 shown in FIG. 8, sensors for the respective RGB colors are required for each of the first and second image generators. That is, a total of six sensors are required and the component cost increases. In the image display apparatus 500 according to this embodiment, one or two sensors is capable of detecting a state of each of the first and second image light beams 10 and 20, and thus the component cost can be reduced.

(Moving Mechanism is Unnecessary)

In the image display apparatus 900 shown in FIG. 8, it is conceivable that the sensor is moved as appropriate on an optical path between an image combining unit 950 and the projection optical system 970 for sensing the first and second image light beams. That is, it is a configuration in which the sensor is moved on the optical path for sensing and the sensor is moved outside the optical path during normal operation.

In this case, a moving mechanism that moves the sensor is required, which makes the apparatus complicated. Further, a space for inserting the sensor is required, which increases the size of the apparatus. For example, in a case where the distance from the first and second image generators to the image combining unit 950 increases, the back focus increases. It contributes to an increase in size of the projection optical system and design is also difficult. Moreover, there is a possibility that moving the sensor causes lowering of the reliability of the sensing result, an increase in operation time, an increase in the cost, and the like.

In the image display apparatus 500 according to this embodiment, such problems do not arise because the sensor unit 80 is fixed on the back side of the image combining unit 50.

OTHER EMBODIMENTS

The present technology is not limited to the above-mentioned embodiment and various other embodiments can be made.

Figure 9:
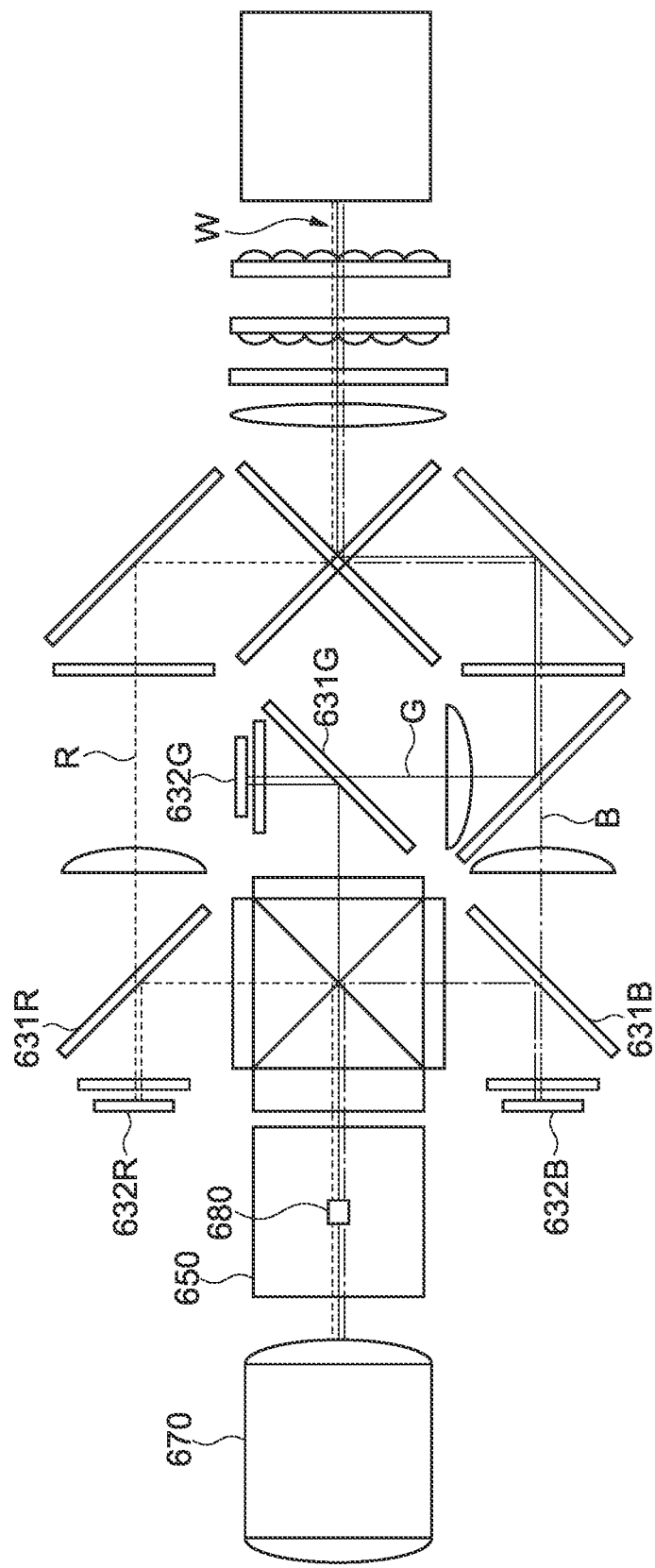
FIG. 9 A schematic diagram showing another configuration example of the image generator.
Figure 10:
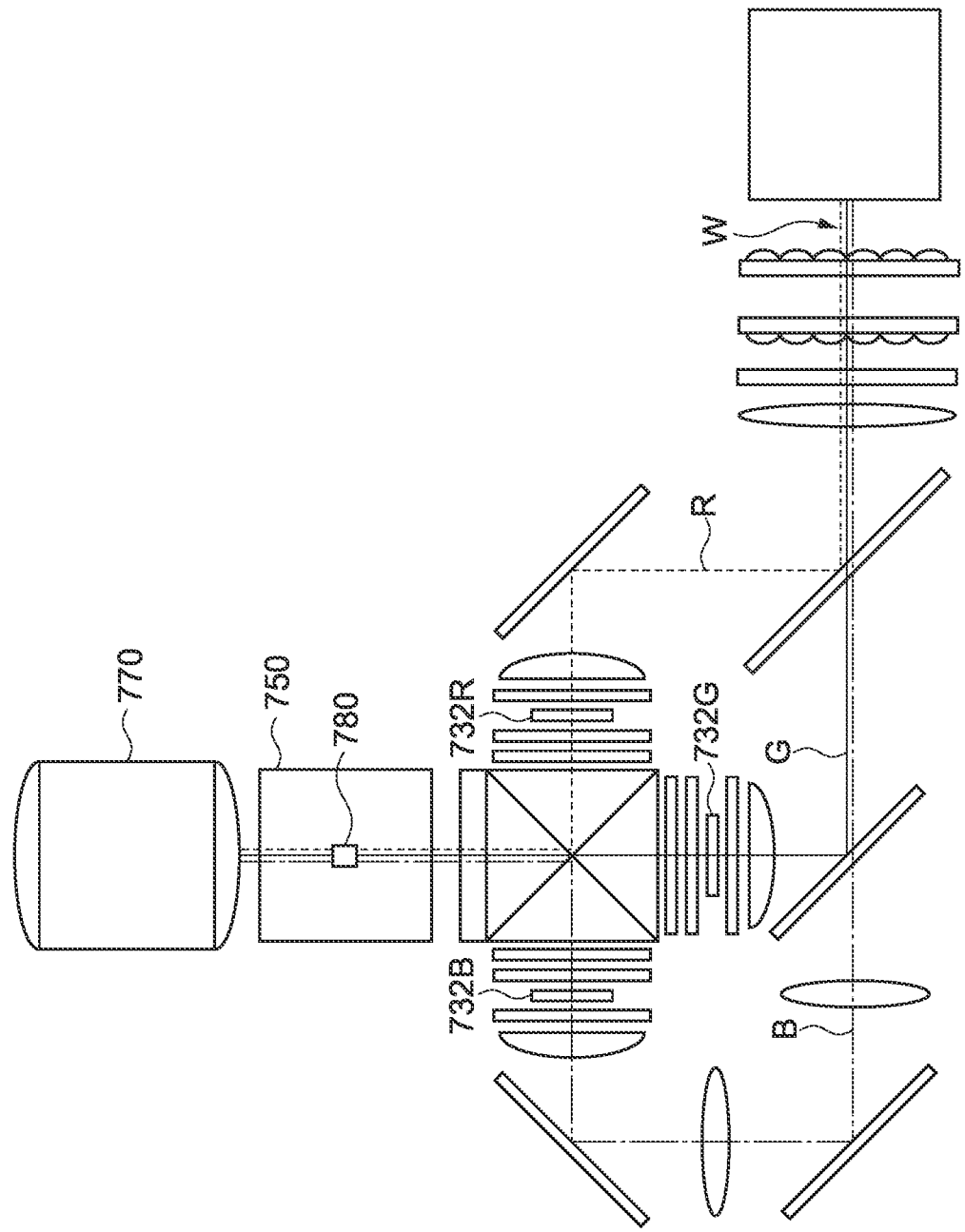
FIG. 10 A schematic diagram showing another configuration example of the image generator.
Figure 11:
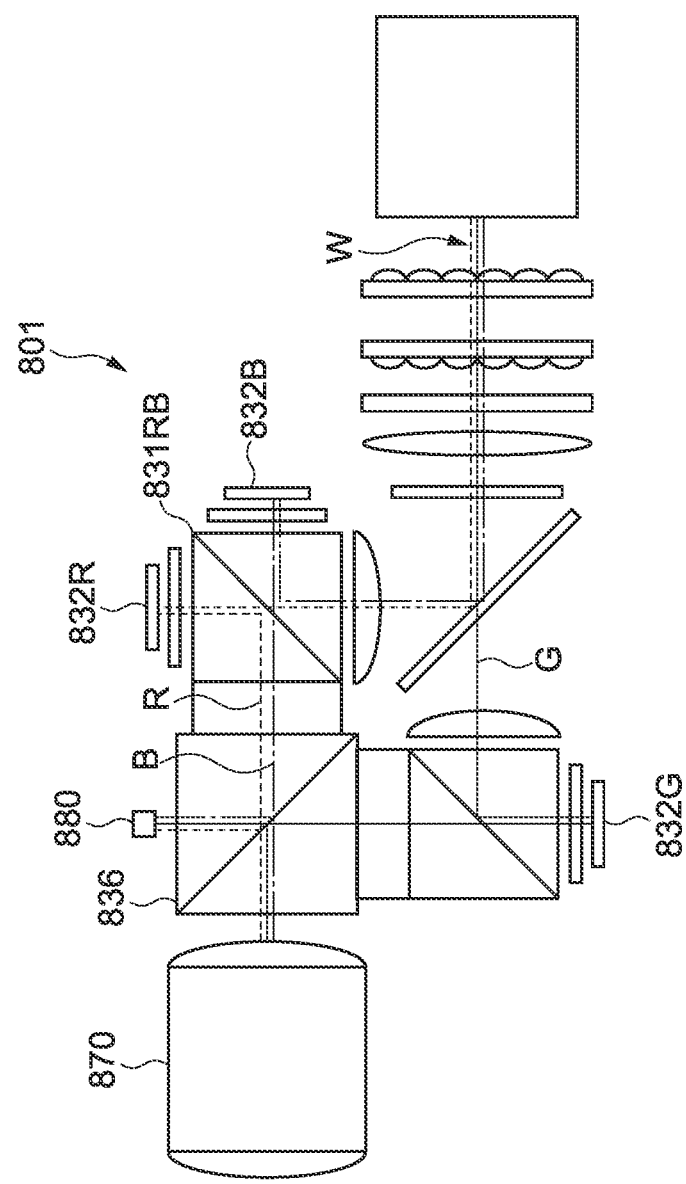
FIG. 11 A schematic diagram showing another configuration example of the image generator.

FIGS. 9 to 11 are schematic diagrams each showing another configuration example of the image generator. As shown in FIG. 9, the prism-type beam splitters may be replaced by other polarization devices such as wire grid polarizers as reflective polarizers 631 (631R, 631G, and 631B). Further, orientations in which reflective optical modulators 632 (632R, 632G, and 632B) are disposed are also not limited and may be set as appropriate. As in the above-mentioned embodiment, the states of the first and second image light beams can be detected with high accuracy by arranging a sensor unit 680 on the back side of an image combining unit 650 positioned just in front of a projection optical system 670.

As shown in FIG. 10, transmissive optical modulators 732 (732R, 732G, and 732B) may be used. For example, polarization plates and compensation plates are disposed, sandwiching the transmissive optical modulators 732 therebetween. Alternatively, an arbitrary configuration may be employed. As in the above-mentioned embodiment, states of the first and second image light beams can be detected with high accuracy by arranging a sensor unit 780 on the back side of an image combining unit 750 positioned just in front of a projection optical system 770.

FIG. 11 is a schematic diagram showing a configuration example of an image display apparatus including a single image generator. That is, rather than generating and combining a plurality of images such as a right-eye image and a left eye image, a single image generated by a single image generator 801 is projected via a projection optical system 870.

In the image generator 801 shown in FIG. 11, a green modulated light beam G modulated by a reflective optical modulator 832G enters a color combining prism 836. A red modulated light beam R modulated by a reflective optical modulator 832R and a modulated light beam B of blue modulated by a reflective optical modulator 832B are emitted along the same optical path as a reflective polarizer 831RB and enter the color combining prism 836.

The color combining prism 836 functions as an embodiment of an optical device according to the present technology. That is, the color combining prism 836 reflects a part of the green modulated light beam G toward the projection optical system 870 as the first split light beam. The color combining prism 836 transmits another part of the green modulated light beam G as it is as the second split light beam.

Moreover, the color combining prism 836 transmits a part of the red modulated light beam R and a part of the blue modulated light beam B as they are toward the projection optical system 870 as the first split light beam. The color combining prism 836 reflects another part of the red modulated light beam R and another part of the blue modulated light beam B as the second split light beam to travel on an optical path of the other part of the green modulated light beam G.

A sensor unit 880 is disposed on optical paths of the other parts of the respective RGB colors (second split light beam). The color combining prism 836 prevents the reflected light beam from the projection optical system 870 from entering the sensor unit 880. Therefore, a state of each of the modulated light beams of RGB can be detected with high accuracy.

As described above, the present technology is not limited to the image display apparatus that generates two images by using the six optical modulators and combining them and is applicable to an arbitrary image display apparatus. For example, the image generator as illustrated in FIG. 2, 9, or 10 can also be disposed alone and the prism-type beam splitter disposed as the image combining unit can also be disposed as the optical device according to the present technology. For example, instead of the polarization plate 137 shown in FIG. 2, a prism-type polarization beam splitter like the image combining unit 50 is disposed as the optical component that adjusts the polarization state. Then, a state of an image light beam emitted from the image generator can be detected with high accuracy by arranging the sensor unit on the back side thereof.

Moreover, the optical device according to the present technology can be disposed at an arbitrary position on the main optical path. For example, the polarization beam splitters 134 shown in FIG. 2 may be used as an embodiment of the optical device according to the present technology and the sensor unit may be disposed on the back side thereof. Also in this case, a state of the image light beam can be detected with high accuracy.

Regarding the optical device according to the present technology, it is not limited to the polarization beam splitter and a half mirror, a glass plate, or the like can be used. An arbitrary optical component capable of splitting the light beam into the first and second split light beams and prevents the light beam, which backwardly travels on the optical path of the first split light beam, from travelling along the optical path of the second split light beam may be used. In a case where a plate-like optical component, not the prism type, is used, a surface on a side on which the first split light beam is emitted becomes the first emitting surface and a surface on which the second split light beam is emitted becomes the second emitting surface.

Moreover, an angle of the light-splitting surface that crosses the incident light beam is also not limited to 45 degrees and may be arbitrarily set.

The present technology is not limited to the case where the first and second image light beams are image light beams of the right-eye image and the left eye image in the image display apparatus using the six liquid-crystal panels and the like. The same image light beams generated on the basis of the same image signals may be respectively projected as the first and second image light beams. For example, the lifetime of the liquid-crystal panel and the like can be prolonged by reducing the amount of light of the light beams that enter the liquid-crystal panel and the like. Then, combining and projecting the same images can suppress lowering of the luminance and high luminance is achieved. As a matter of course, an interesting viewing effect can also be provided by voluntarily combining and projecting different images.

Hereinabove, the case of sensing leaking light of each of the first and second image light beams has been exemplified. That is, the optical component configured for applying a predetermined action to the incident light beam splits the incident light beam into a first split light beam to which the predetermined action is applied and a second split light beam to which the predetermined action is not applied. For example, with the above-mentioned image combining unit, the application of the predetermined action is transmission/reflection with respect to the predetermined polarization states. Then, the first split light beam to which the transmission/reflection action with respect to the predetermined polarization states are applied and the second split light beam to which this action is not applied are split.

The present technology is not limited. The first and second split light beams may be emitted by applying the predetermined action to both. For example, it is the case where the half mirror exemplified above is used or the like.

At least two features of the above-mentioned features according to the present technology can also be combined. That is, various features described in the respective embodiments may be arbitrarily combined across the respective embodiments. Further, the above-mentioned various effects are merely exemplary and not limitative. Moreover, other effects may be provided.

It should be noted that, the present technology can also take the following configurations.

(1) An image display apparatus, including:
  an optical modulator;
  an optical device that
    splits a modulated light beam modulated by the optical modulator into a first split light beam and a second split light beam, the first split light beam and the second split light beam each travelling in a different direction, and
    prevents a light beam, which backwardly travels on an optical path of the first split light beam and enters the optical device, from travelling along an optical path of the second split light beam; and
  a sensor unit that is disposed on the optical path of the second split light beam and detects a state of the second split light beam.

(2) The image display apparatus according to (1), in which
  the optical device
    is disposed on a main optical path of the modulated light beam,
    emits the first split light beam along the main optical path, and
    emits the second split light beam along another optical path, and
  the sensor unit is disposed on the other optical path.

(3) The image display apparatus according to (1) or (2), in which
  the optical device includes
    a first emitting surface that emits the first split light beam, and
    a second emitting surface that emits a second split light beam, the second emitting surface being different from the first emitting surface, and
  the sensor unit is disposed on a side of the second emitting surface.

(4) The image display apparatus according to any one of (1) to (3), in which
  the optical device includes a light-splitting surface that is disposed obliquely to a direction of incidence of the modulated light beam that enters the optical device.

(5) The image display apparatus according to (4), in which
  the light-splitting surface
    transmits a part of the modulated light beam that enters the light-splitting surface as the first split light beam, and
    reflects another part of the modulated light beam as the second split light beam, and
  the sensor unit is disposed on a side of the light-splitting surface that reflects the second split light beam.

(6) The image display apparatus according to (4), in which
  the light-splitting surface
    reflects a part of the modulated light beam that enters the light-splitting surface as the first split light beam, and
    transmits another part of the modulated light beam as the second split light beam, and
  the sensor unit is disposed on a side of a surface on an opposite side of the light-splitting surface.

(7) The image display apparatus according to any one of (1) to (6), in which
  the optical device splits the modulated light beam such that an amount of light of the first split light beam is larger than an amount of light of the second split light beam.

(8) The image display apparatus according to any one of (1) to (7), further including:
  a combining unit that combines a plurality of modulated light beams to generate a combined modulated light beam; and
  a projecting unit that projects the combined modulated light beam generated by the combining unit, in which
  the optical device
    is disposed between the combining unit and the projecting unit, and
    splits the combined modulated light beam into the first split light beam and the second split light beam.

(9) The image display apparatus according to any one of (1) to (8), in which the optical device includes a light-splitting prism including
  a first surface that the modulated light beam enters,
  a light-splitting surface that splits the modulated light beam that enters the first surface, and
  a second surface from which the second split light beam split by the light-splitting surface is emitted, and
the sensor unit is disposed in proximity to the second surface of the light-splitting prism.

(10) The image display apparatus according to any one of (1) to (9), in which
the optical device includes a polarization beam splitter, a half mirror, or a glass plate.

(11) The image display apparatus according to any one of (1) to (10), further including
a first emitter that emits a first image light beam in a first polarization state in a first direction, in which
the optical device includes a light-splitting surface that is disposed obliquely to the first direction,
the light-splitting surface
  transmits a part of the first image light beam to travel on a first optical path extending in the first direction, and
  reflects another part of the first image light beam to travel on a second optical path extending in a second direction substantially orthogonal to the first direction, and
the sensor unit is disposed on the second optical path.

(12) The image display apparatus according to (11), further including
a second emitter that emits a second image light beam in a second polarization state in the second direction, in which
the light-splitting surface
  is disposed obliquely to the second direction,
  reflects a part of the second image light beam to travel on the first optical path, and
  transmits another part of the second image light beam to travel on the second optical path.

(13) The image display apparatus according to (12), in which
the sensor unit includes
  a first filter that extracts a light beam in the first polarization state,
  a first sensor that detects a state of the light beam extracted by the first filter,
  a second filter that extracts a light beam in the second polarization state, and
  a second sensor that detects a state of the light beam extracted by the second filter.

(14) The image display apparatus according to any one of (1) to (13), in which
the sensor unit detects at least one of intensity, chromaticity, or a luminous flux shape of the second split light beam.

(15) The image display apparatus according to any one of (1) to (14), in which
the optical device
  is configured for applying a predetermined action to an incident light beam, and
  splits the modulated light beam that enters the optical device into the first split light beam to which the predetermined action is applied and the second split light beam to which the predetermined action is not applied.

REFERENCE SIGNS LIST

OP1 main optical path
OP2 another optical path
10, 10A, 10B, 10C first image light beam
20, 20A, 20B, 20C second image light beam
50, 650, 750 image combining unit
51 junction surface
70, 670, 770, 870 projection optical system
80, 680, 780, 880 sensor unit
81 sensor
81a first sensor
81b second sensor
89a first polarization plate
89b second polarization plate
100 first image generator
110 illumination optical system
130 image modulating unit
132 (132R, 132G, and 132B), 232G, 632, 832R, 832G, 832B reflective optical modulator
200 second image generator
500 image display apparatus
732 transmissive optical modulator
801 image generator
836 color combining prism

The invention claimed is:

1. An image display apparatus, comprising:
a first optical device configured to extract a first light beam corresponding to a first color, the first color being one of red, green, and blue,
a second optical device configured to split the first light beam into a first split light beam and a second split light beam, the first split light beam and the second split light beam each travelling in a different direction, and
a sensor disposed on an optical path of the second split light beam and comprising a first filter and a second filter, the sensor being configured to detect a state of the second split light beam, wherein
the first filter is configured to transmit a light beam in a first wavelength range corresponding to the first color,
the second filter is configured to transmit a light beam in a second wavelength range, the second wavelength range including at least part of the first wavelength range and being different from the first wavelength range, and
the sensor comprises a plurality of the first filters and a plurality of the second filters, the plurality of the first filters and the plurality of the second filters being arranged in a two-dimensional form, and each of the plurality of the second filters is arranged to not be next to another one of the second filters.

2. The image display apparatus according to claim 1, wherein
the first optical device is configured to split a light beam into the first light beam and a second light beam corresponding to a color different from the first color,
the image display apparatus further comprising:
a first light modulator configured to modulate the first light beam, and
a color combining device configured to combine the modulated first light beam and a modulated light beam based, at least in part, on the second light beam.

3. The image display apparatus according to claim 2, wherein
the first light modulator is disposed along a first surface of the color combining device and disposed on an optical path of the first light beam.

4. The image display apparatus according to claim 3, further comprising:
a third optical device configured to split the second light beam into a third light beam corresponding to a second color and a fourth light beam corresponding to a third color,
wherein the second color is one of red, green, and blue and different from the first color, and the third color is one of red, green, and blue and different from the first color and the second color;
a second light modulator configured to modulate the third light beam; and
a third light modulator configured to modulate the fourth light beam, wherein
the second light modulator is disposed along a second surface of the color combining device and disposed on an optical path of the third light beam, and
the third light modulator is disposed along a third surface of the color combining device and disposed on an optical path of the fourth light beam.

5. The image display apparatus according to claim 4, wherein
the color combining device is configured to combine the modulated first light beam, the modulated third light beam, and the modulated fourth light beam.

6. The image display apparatus according to claim 5, wherein
the first color is red,
the second color is green, and
the third color is blue.

7. The image display apparatus according to claim 6, wherein
the first light modulator, the second light modulator, and the third light modulator are transmissive light modulators.

8. The image display apparatus according to claim 7, wherein
the first optical device is configured to split, based on wavelength, a light beam corresponding to white into the first light beam and the second light beam corresponding to green and blue.

9. The image display apparatus according to claim 8, wherein the sensor further comprises:
a third filter configured to transmit a light beam in a third wavelength range corresponding to one of green or blue, and
a fourth filter configured to transmit a light beam in a fourth wavelength range corresponding to the other one of green or blue.

10. The image display apparatus according to claim 9, further comprising polarization plates, each of the polarization plates being disposed adjacent to each of the first light modulator, the second light modulator, and the third light modulator, respectively.

11. The image display apparatus according to claim 2, wherein
the second optical device is configured to split the first light beam modulated by the first light modulator into the first split light beam and the second split light beam.

12. An image display apparatus, comprising:
a first optical device configured to extract a first light beam corresponding to a first color, the first color being one of red, green, and blue,
a second optical device configured to split the first light beam into a first split light beam and a second split light beam, the first split light beam and the second split light beam each travelling in a different direction, and
a sensor disposed on an optical path of the second split light beam and comprising a first filter and a second filter, the sensor being configured to detect a state of the second split light beam, wherein
the first filter is configured to transmit a light beam in a first wavelength range corresponding to the first color,
the second filter is configured to transmit a light beam in a second wavelength range, the second wavelength range including at least part of the first wavelength and being different from the first wavelength range,
the sensor further comprises a third filter configured to transmit a light beam in a third wavelength range corresponding to one of green or blue, and
the sensor further comprises a fourth filter configured to transmit a light beam in a fourth wavelength range corresponding to the other one of green or blue.

13. The image display apparatus according to claim 12, wherein
the first optical device is configured to split a light beam into the first light beam and a second light beam corresponding to a color different from the first color,
the image display apparatus further comprising:
a first light modulator configured to modulate the first light beam, and
a color combining device configured to combine the modulated first light beam and a modulated light beam based, at least in part, on the second light beam.

14. The image display apparatus according to claim 13, wherein
the first light modulator is disposed along a first surface of the color combining device and disposed on an optical path of the first light beam.

15. The image display apparatus according to claim 14, further comprising:
a third optical device configured to split the second light beam into a third light beam corresponding to a second color and a fourth light beam corresponding to a third color,
wherein the second color is one of red, green, and blue and different from the first color, and the third color is one of red, green, and blue and different from the first color and the second color;
a second light modulator configured to modulate the third light beam; and
a third light modulator configured to modulate the fourth light beam, wherein
the second light modulator is disposed along a second surface of the color combining device and disposed on an optical path of the third light beam, and
the third light modulator is disposed along a third surface of the color combining device and disposed on an optical path of the fourth light beam.

16. The image display apparatus according to claim 15, wherein
the color combining device is configured to combine the modulated first light beam, the modulated third light beam, and the modulated fourth light beam.

17. The image display apparatus according to claim 16, wherein
the first color is red,
the second color is green, and
the third color is blue.

18. The image display apparatus according to claim 17, further comprising polarization plates, each of the polarization plates being disposed adjacent to each of the first light modulator, the second light modulator, and the third light modulator, respectively.

19. An image display apparatus, comprising:
a first optical device configured to extract a first light beam corresponding to a first color, the first color being one of red, green, and blue,
a second optical device configured to split the first light beam into a first split light beam and a second split light beam, the first split light beam and the second split light beam each travelling in a different direction, and
a sensor disposed on an optical path of the second split light beam and comprising a first filter and a second filter, the sensor being configured to detect a state of the second split light beam, wherein
the first filter is configured to transmit a light beam in a first wavelength range corresponding to the first color,
the second filter is configured to transmit a light beam in a second wavelength range, the second wavelength range including at least part of the first wavelength and being different from the first wavelength range, and
the second filter is configured to transmit a light beam corresponding to a noise component in the light beam passing through the first filter.

20. The image display apparatus according to claim 19, wherein
the first color is red, and
the first optical device is configured to split a light beam into the first light beam and a second light beam corresponding to a color different from the first color, the image display apparatus further comprising:
a third optical device configured to split the second light beam into a third light beam corresponding to green and a fourth light beam corresponding to blue;
a first light modulator configured to modulate the first light beam;
a second light modulator configured to modulate the third light beam;
a third light modulator configured to modulate the fourth light beam;
a color combining device configured to combine the modulated first light beam, the modulated third light beam, and the modulated fourth light beam; and
a plurality of polarization plates, each of the plurality of polarization plates being disposed adjacent to each of the first light modulator, the second light modulator, and the third light modulator, respectively, wherein
the first light modulator is disposed along a first surface of the color combining device and disposed on an optical path of the first light beam,
the second light modulator is disposed along a second surface of the color combining device and disposed on an optical path of the third light beam, and
the third light modulator is disposed along a third surface of the color combining device and disposed on an optical path of the fourth light beam.

* * * * *